United States Patent [19]

Jabsen

[11] 4,125,435

[45] Nov. 14, 1978

[54] GRID LATTICE WITH SLIDING STRAP

[75] Inventor: Felix S. Jabsen, Lynchburg, Va.

[73] Assignee: The Babcock & Wilcox Company, New York, N.Y.

[21] Appl. No.: 772,183

[22] Filed: Feb. 25, 1977

[51] Int. Cl.² .............................................. G21C 3/30
[52] U.S. Cl. ..................................................... 176/78
[58] Field of Search ..................................... 176/76, 78

[56] References Cited

U.S. PATENT DOCUMENTS

| 3,665,586 | 5/1972 | Jabsen | 176/78 X |
| 3,679,547 | 7/1972 | Warberg | 176/76 X |
| 3,824,153 | 7/1974 | Leaver et al. | 176/76 X |
| 3,892,027 | 7/1975 | Jabsen | 176/78 X |
| 3,933,583 | 1/1976 | Jabsen | 176/78 |
| 3,982,994 | 9/1976 | Jabsen | 176/76 X |
| 4,007,899 | 2/1977 | Piepers et al. | 176/78 X |

Primary Examiner—Peter A. Nelson
Attorney, Agent, or Firm—Joseph M. Maguire; Angelo Notaro

[57] ABSTRACT

The invention provides means for inserting tubular members into a grid structure without mutual contact between the tubular members. After the tubular members are inserted, a movable strap is slid into position, thereby engaging, locating, and supporting the tubular member in a fixed location.

14 Claims, 13 Drawing Figures

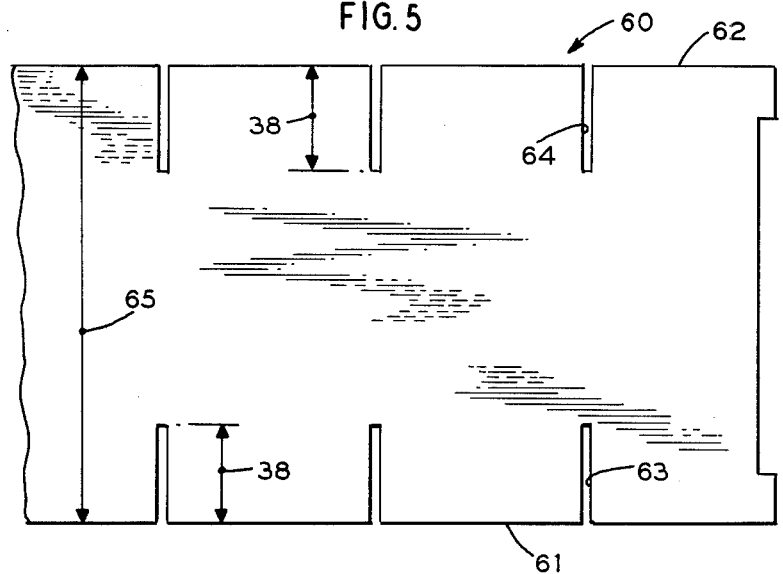
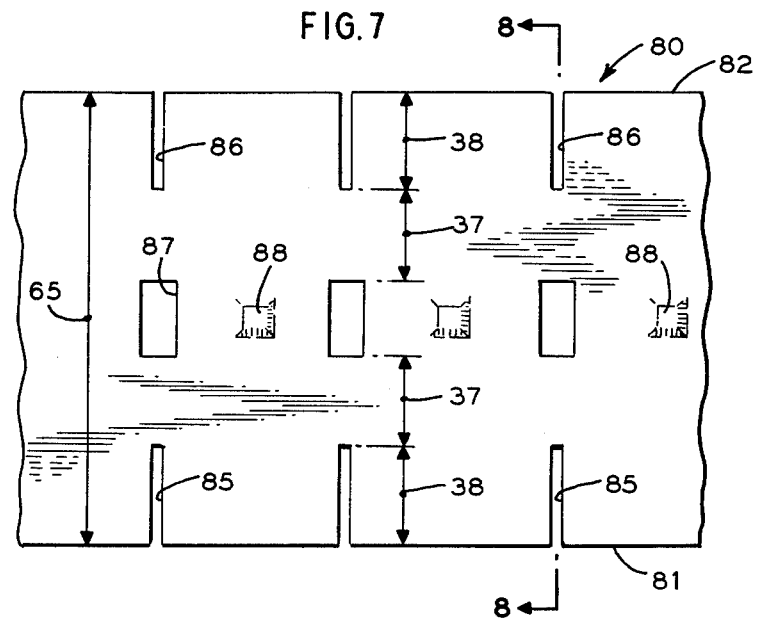
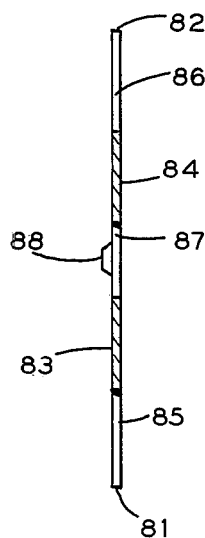
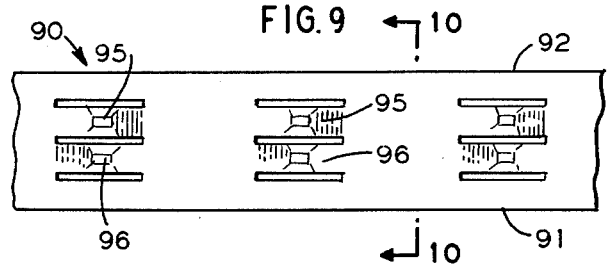
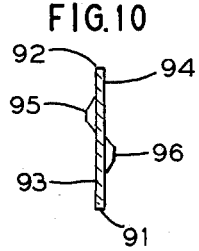

GRID LATTICE WITH SLIDING STRAP

BACKGROUND OF THE INVENTION

1. Field of the Invention

This invention relates to fuel assemblies for nuclear reactors and, more particularly, to methods and apparatus for inserting and receiving fuel rods within grid plate spacer and support structures.

2. Summary of the Prior Art

In heterogenous nuclear reactors, nuclear fuel is frequently maintained separately from the moderator and coolant by encasing the fuel in thinwalled, cylindrical tubes known as fuel elements or rods. Groups of multiple fuel rods, commonly designated fuel assemblies, may be spaced in carefully designed arrays and laterally supported at several points along their longitudinal axes by grids of plates intersecting and interlocking in an egg-crate fashion to form a cellular lattice. One fuel rod is lodged in each of the cells thus formed in the grid structure. Generally, protrusions or the like, projecting from the surfaces of the portions of the plates bear against the outer surface of the fuel rod within a particular cell, serving to support the rod and restraining rod motion.

In order to preclude premature failure of the fuel rods, it is important to design the grid plate structure so that the protrusions do not mar the fuel rods during their insertion and removal. Hence, the prior art teaches the use of combinations of rigid and resilient protrusions, and external means which deflect the resilient protrusions to permit unhindered fuel rod insertion and removal.

The neutron absorption characteristics, mechanical strength, and corrosion resistance of the material used to form the grid plates are also important. Any absorption in the reactor of neutrons which do not cause further fission or the production of new fissionable material is defined as parasitic absorption. Neutron economy is the degree to which neutrons in the reactor are used for desired ends such as propagation of the chain reaction, converting fertile to fissionable material, or producing isotopes instead of being lost by parasitic absorption or leakage. In order to maximize neutron economy, it is desirable to minimize the volume of material used to construct the grid plate structure and to utilize materials having a low probability of neutron capture, as is measured by the neutron capture cross section of the material.

A balance must be struck between the often conflicting requirements of sufficient material to construct a grid plate which positively supports and spaces the fuel elements, which has sufficient resilience, and which has a low neutron capture cross section.

Zirconium and its alloys, chiefly in the form of zircaloy, are known to have a generally lower neutron cross section than any metal of comparable mechanical strength and corrosion resistance. However, as noted, it has been found necessary in the prior art to provide resilient protrusions to prevent undue damage to the fuel rod surfaces. Suitable spring materials, such as Inconelalloy 718, have relatively high neutron absorption. Inconel, a registered trademark of the International Nickel Company, Inc., has the following nominal composition (in percent):

Cr — 15.0
Fe — 6.75
Al — 0.8
Ti — 2.5
Cb — 0.85
Mn — 0.7
C — 0.04
Ni — balance. Hence, apparent economic advantages can be realized in a grid plate design substantially utilizing zircaloy plates.

Thus, there exists a need to provide an efficient, economical apparatus and method for inserting fuel rods into cells of a grid plate lattice that utilize protrusions to positively space and support the fuel elements without marring the fuel element surfaces.

A versatile grid plate design, moreover, adaptable for supporting the tubes of vapor generators, shell and tube heat exchangers and the like, would offer further advantages.

SUMMARY OF THE INVENTION

According to the present invention, a grid plate structure is composed of mutually interlocking and intersecting plates to form an array of rectangular cells. Each cell is generally bordered by portions of two opposite plates having arcuate protrusions with partial surfaces that match the contour of the associated fuel rod. A third border of each cell generally includes a resilient strap which is located between two longitudinally spaced grid plate members of the third border. The strap may be transversely slid in the plane of the third border. Protrusions project a portion of the faces of each side of the strap into each adjacent cell. Prior to insertion of a fuel rod into each cell, the straps are orientated so that protrustions thereon are offset from the center of each cell. After the fuel rods are inserted, the strap is slid in a transverse manner causing its protrusions to bear against the fuel rods, thereby wedging each fuel rod between a generally spring-mounted strap protrusion and the curved protrusions of the two perpendicularly adjacent plates bordering the cell. An additional grid plate is provided to establish an odd-numbered array of cells.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

FIG. 5 is a front elevation view of another grid plate according to the invention;

FIG. 7 is a front elevation of still another grid plate according to the invention;

FIG. 8 is a side view of the grid plate shown in FIG. 7 taken along the line 8—8;

FIG. 9 is a front elevation view of a pull strap according to the invention;

FIG. 10 is a side view of the strap shown in FIG. 9 taken along line 10—10;

DESCRIPTION OF THE PREFERRED EMBODIMENTS

Figure 1:
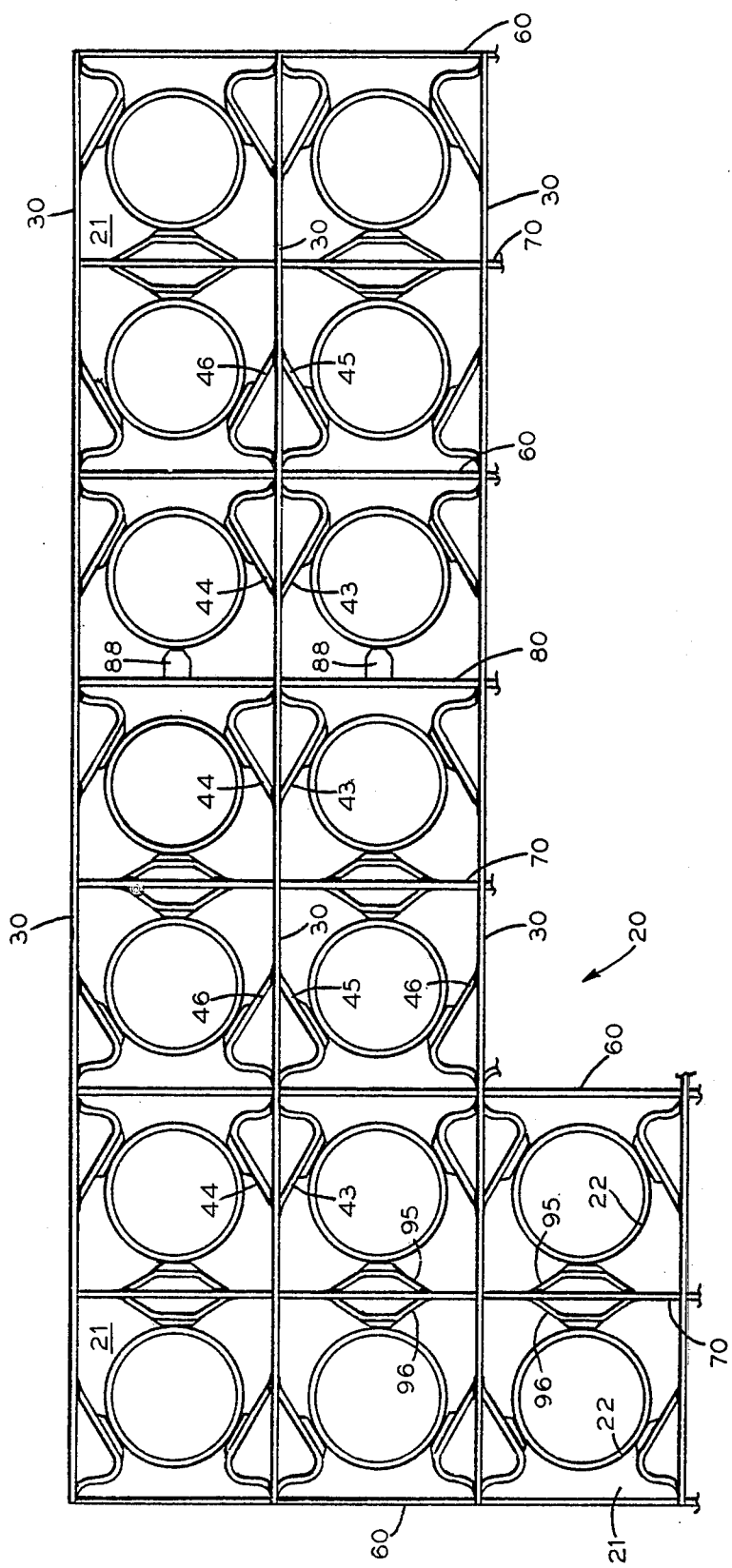
FIG. 1 is a plan view of a representative portion of the spacer grid with a number of fuel rods inserted.

FIG. 1 illustrates a portion of a grid 20 of plates arranged, in accordance with a preferred embodiment of the invention, to form a multiplicity of cells 21 having substantially open cross section. Nuclear fuel bearing rods 22, only several are shown for clarity, are disposed through the cells with their longitudinal axes in parallel.

The term "longitudinal" as used in the specification and claims shall, unless otherwise qualified, refer to the direction in which the length of the fuel rods extends.

Figure 2:
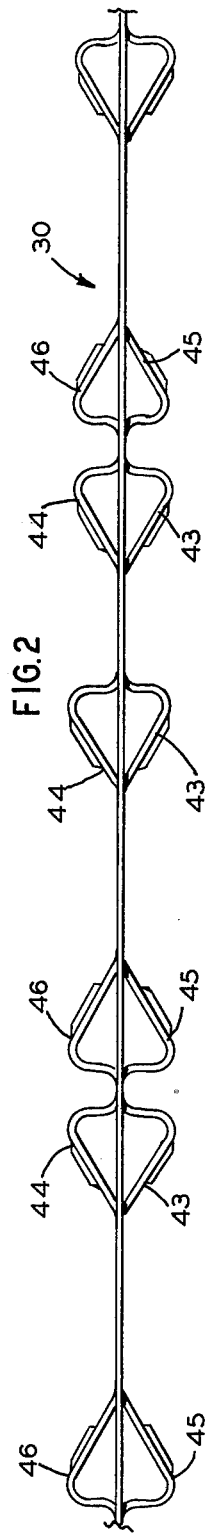
FIG. 2 is a plan view of a part of a grid plate used in the invention.
Figure 3:
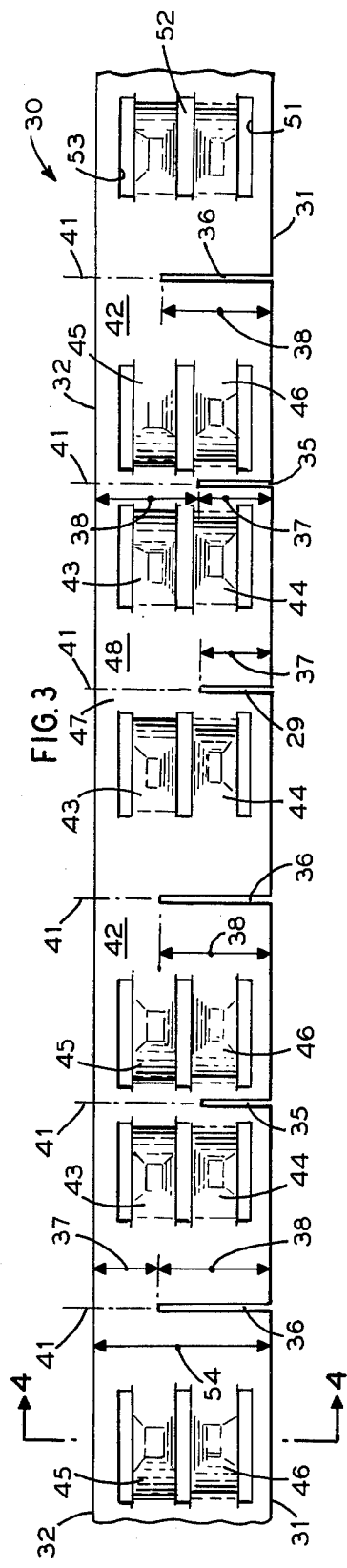
FIG. 3 is a front elevation of the grid plate shown in FIG. 2.
Figure 4:
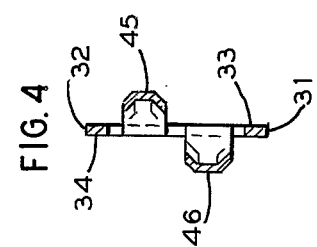
FIG. 4 is a side view of the grid plate shown in FIG. 3 taken along the line 4—4.

A grid plate 30 is shown in detail in FIGS. 2, 3 and 4. The grid plate 30 is a generally flat, rectangular sheet of metal having mutually opposing lengthwise edges 31, 32 and faces 33, 34.

A generally centrally disposed slot 29 (FIG. 3) perpendicularly intersects lengthwise edge 31. A plurality of slots 35, 36 perpendicularly intersect edge 31, on either side of slot 29, such that intersections by slots 35 and 36 occur in alternate succession at equally spaced intervals along the edge 31, a slot 35 being located on one side of the single slot 29 and a slot 36 on the other side of slot 29. Each slot 35 and the single slot 29 recess a distance 37 from edge 31. Each slot 36 extends a greater distance 38 from edge 31.

To simplify the discussion, any portion of the grid plate 30 which is bounded by the centerlines 41, drawn through adjacent pairs of slots 35 and 36, will be referred to as a panel 42; the portion of the plate bounded by the centerlines 41 of the single slot 29 and the adjacent slot 36 will be a panel 47; and, the portion of the plate bounded by the centerline 41 of the single slot 29 and the adjacent slot 35 will be a panel 48. Hence, the plate 30 may thus be described as being made up of a string of generally rectangularly shaped panels 42, 47 and 48.

Rigid protrusions, as hereinafter described, project a portion of each face of the plate 30 at the various panels. Protrusions 43 and 45 are raised from face 33 (FIG. 2) such that each successive panel 42 is alternately provided with off-centered protrusions either 43 or 45, while the preceding and succeeding panel 42 is provided with the other protrusion. The panels 47 and 48 are each projected at face 33 by a single protrusion 43. Similarly, a plurality of protrusions 44 and 46 are raised from the face 34 (FIG. 2) such that each successive panel 42 alternately contains an off-centered single protrusion 44 or 46. The face 34 at the panels 47 and 48 is raised by an off-centered protrusion 44. The protrusions 43, 44, 45, 46 are arranged such that the opposite faces of any single panel 42, 47 or 48 contain either a combination of protrusions 43 and 44, or alternately, only in the case of the more numerous panels 42, a combination of oppositely projecting protrusions 45 and 46. The protrusions, on the oppositely disposed faces of any panel, are in longitudinal alignment (FIG. 3).

As is best shown in FIGS. 2 and 3, a portion of each protrusion is generally contoured to follow the perimetrical shape of the fuel rod that will be inserted through the cell into which the protrusion projects. The generally contoured portion of each protrusion is impressed in part. The impression extends further into the cell and actually makes contact with the fuel rod. Moreover, the protrusions on adjacent panels 42 are spaced off center, more closely about the slots 35 than slots 36 with the contoured portion of the protrusion disposed on the side of the panel adjoining slot 36. The protrusions 43 and 44 of panel 47 are disposed more closely toward the slot 29 side of panel 47 with the contoured part of the protrusions disposed away from the slot 29 side of panel 47. The protrusion 43 and 44 of panel 48 are located more closely toward the slot 35 side of the panel 48 with the contoured portion of each protrusion disposed toward side of the panel 48 adjoining slot 29.

Rectangular cutouts 51, 52, 53, disposed with their lengths parallel to the lengthwise edges 31, 32 of the plate 30 border the protrusions as shown in FIG. 3. In practice, the cutouts are fabricated in the generally flat plate 30 and the protrusions 43, 44, 45, 46 are subsequently pressed into the form described above. The plate 30 has an overall width extending a distance 54, a distance 38 between the inner recess of slots 35 and edge 32, and a distance 37 between the inner recess of slot 36 and edge 32.

FIG. 5 shows a grid plate 60. The plate 60 is a flat, generally rectangular sheet of metal having mutually opposing lengthwise edges 61 and 62. The edges 61 and 62 are provided with a plurality of like-dimensioned, equally spaced slots 63 and 64, respectively, to interlock with intersecting plates 30. Each slot 63 is in longitudinal alignment with a slot 64 in the opposite edge. Slots 63 and 64 have the same dimensions, each slot extending a perpendicular distance 38 from the edge in which it is formed. The plate 60 has an overall width extending a distance 65.

Figure 6:
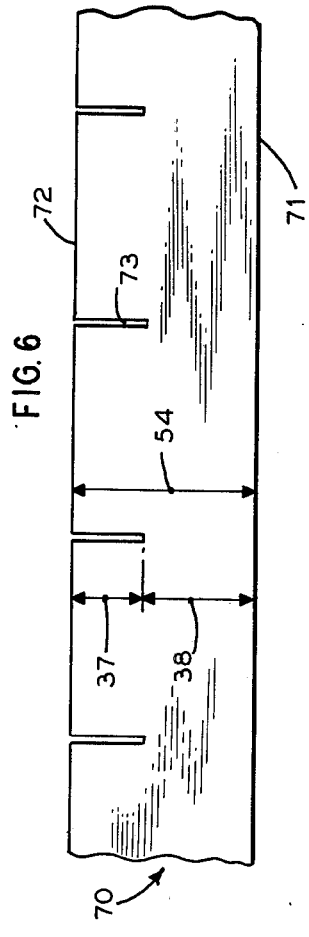
FIG. 6 is a front elevation view of still another grid plate according to the invention.

A grid plate 70 is illustrated in FIG. 6. The plate 70 is a flat, generally rectangular sheet of metal having mutually opposing lengthwise edges 71 and 72. A plurality of like-dimensioned slots 73, which provide interlocking with intersecting plates 30, as described hereinafter, are formed at equally spaced intervals along the edge 72. Each slot 73 extends a perpendicular distance 37 from edge 72. The overall width of plate 70 extends through a distance 54. A distance 38 exists between the inner recess of each slot 73 and edge 71.

A grid plate 80 is shown in FIGS. 7 and 8. The plate 80 has mutually opposing lengthwise edges 81, 82, and faces 83, 84. Pluralities of like-dimensioned slots 85 and 86 are formed in edges 81 and 82, respectively, at equally spaced intervals along the respective edges. The slots 85 and 86 provide interlocking for intersecting plates 30 as described below. Each slot 85 is longitudinally aligned with a slot 86. A plurality of cutouts 87, each spaced equidistantly between and in longitudinal axial alignment with a pair of longitudinally spaced slots 85 and 86 is formed in plate 80. A protrusion 88 projects the portion of the face 83 between the cutouts 87 transversely outward of the plate 80. The plate 80 has an overall width extending a distance 65. Slots 85 and 86 recess a distance 38 from edges 81 and 82 respectively. Each cutout 87 is equidistantly spaced a distance 37 from the inner recesses of the respective slots 85 and 86 aligned therewith.

FIGS. 9 and 10 illustrate a plate 90 characterized hereinafter by the term "pull strap". The pull strap 90 is a generally rectangular plate having mutually opposing lengthwise edges 91, 92 and faces 93, 94. A plurality of protrusions 95, located at equally spaced intervals along the length of the pull strap, project a portion of face 93; a plurality of similarly spaced protrusions 96 project a portion of face 94 outward. Every protrusion 95 is in longitudinal alignment with a protrusion 96 on the opposite face of plate 90. There are no slots formed in the edges of the pull strap.

In a nuclear reactor application, the pull strap 90 is formed of a suitable spring material such as Inconelalloy 718 and the grid plates 30, 60, 70 and 80 are formed by a more rigid, low neutron absorption material such as zircaloy.

Figure 11:
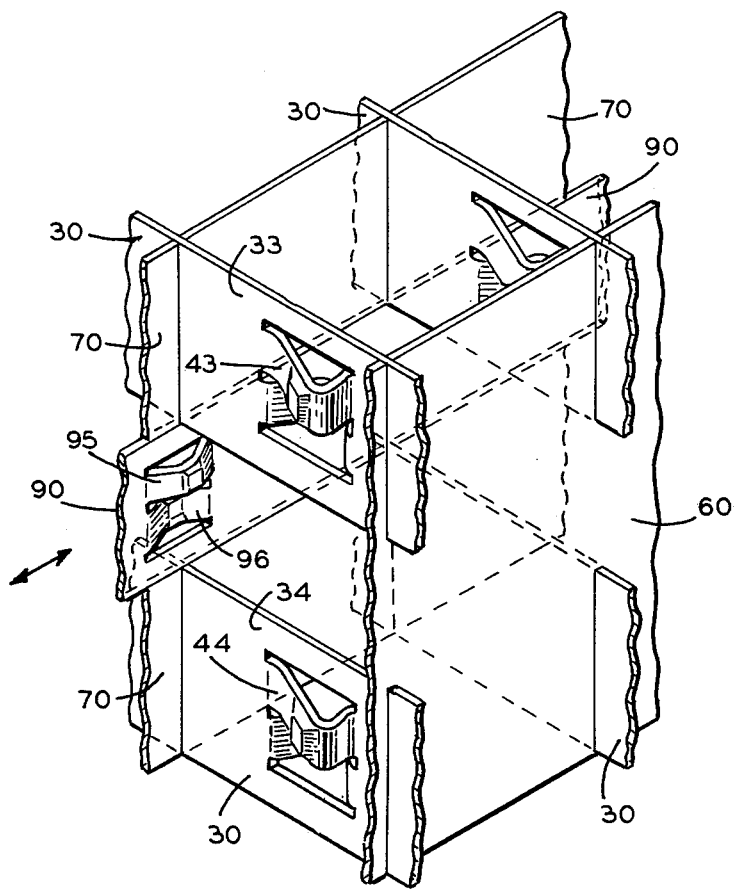
FIG. 11 is a perspective view of a portion of a spacer grid made in accordance with the invention.

As shown in FIG. 11, the plates 30 are arranged in longitudinally spaced pairs, inverted with respect to each other, the upper plate (in the illustrated embodiment) being orientated so the slots thereof open downwardly, and the lower plate being inverted with the slots thereof opening upwardly. Each pair of plates 30 are spaced parallel to similarly disposed pairs of plates 30 throughout the grid plate lattice, and thus form the columns of the lattice as is readily seen in FIG. 1. A combination of plates 60, 70, and 80 cooperate, as described hereinafter, to form the rows of the grid plate lattice.

In a preferred embodiment, a single grid plate 80 (FIG. 1) is orientated perpendicular to the parallel pairs of grid plates 30. Typically, the single plate 80 intersects and interlocks with both the columns of upper and lower plates 30 at slot 29. The slot 29 of each upper plate 30 being intermeshed at a slot 86 of plate 80 and the slot 29 of each lower plate 30 being intermeshed at a slot 85 of plate 80. The portions of the plate 80 between cutouts 87 are relatively more flexible than the rest of the plate due to the bordering cutouts.

Referring to FIG. 11, it can be seen that a plate 70 is disposed in longitudinally opposite and inverted relation with a second plate 70 to form a pair of plates 70. In the illustrated embodiment, the upper plate 70 is orientated so that the slots 73 open upwardly and the lower plate 70 orientated so that the slots 73 open downwardly. Moreover, each plate 70 is located within the lattice to perpendicularly intersect and interlock with the column oriented plates 30 so that slots 73 of plates 70 (FIG. 6) mesh at the slots 36 of the plates 30 (FIG. 3).

As shown in FIG. 1, plates 60 also perpendicularly interlock and intersect with plates 30 such that slots 63 (FIG. 5) of each plate 60 are meshed at the slots 35 (FIG. 3) of the bottom plate 30 (as shown in FIG. 11) of the columns of paired plates 30, and slots 64 (FIG. 5) of the plates 60 mesh with the upper of the paired plates 30 at slots 35.

Hence, the plates 60, 70, and 80 are arrayed to form the rows of the grid plate lattice.

The grid plates 30, 60, 70 and 80 are rigidly held in the interlocking and intermeshing relationship previously described, by welding, brazing or other known connecting means.

A pull strap 90 is longitudinally located (FIG. 11) in sliding contact within the space between each pair of longitudinally aligned plates 70.

Figure 12:
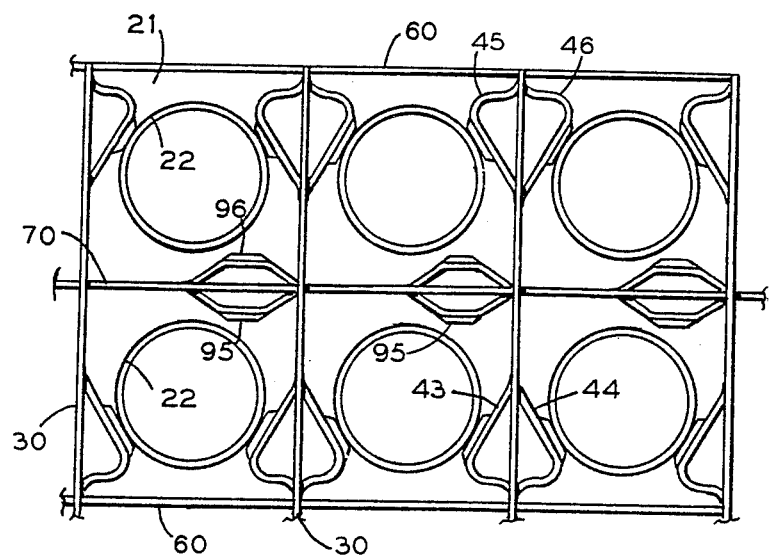
FIG. 12 is a plan view of a representative portion of the spacer grid illustrating the offset of the pull strap prior to locking the fuel rods in place.
Figure 13:
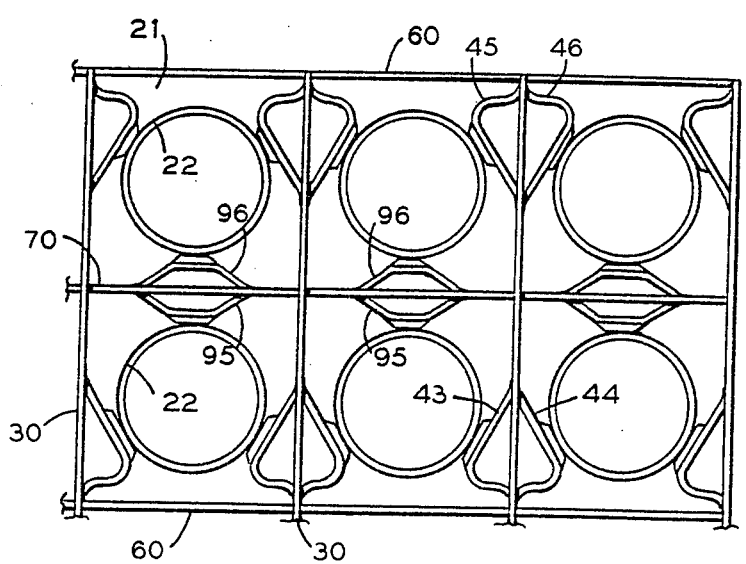
FIG. 13 is a plan view of the grid shown in FIG. 12 after the pull strap has been slid into its fuel rod supporting and locking position.

As is best shown in FIG. 12, on initial insertion of the fuel rod, the pull straps 90, which are located in the plane of plates 70, are positioned with the protrusions 95, 96 offset within each cell 21 by approximately one-half a diameter of a fuel rod. After the fuel rods have been inserted into the grid structure, as is best shown in FIG. 13, the slidable pull strap is slid in a transverse direction until the apices of the protrusions 95, 96 are generally centered with and bear against the associated fuel rod within each adjacent cell. This action laterally fixes the fuel rods between the protrusions 95, 96 of the pull strap and the impression of the contoured portion of the protrusions 43, 44, 45, 46 of the plates 30. The magnitude of the lateral supporting forces thereby generated depends upon the height of the protrusions on the pull strap. The protrusions 95, 96 are shaped to facilitate engagement and centering of the fuel rods. The ends (not shown) of each pull strap may thereafter be bent or cut and welded to the periphery of the grid structure to lock the straps in place. In this manner, the fuel rods are restrained and laterally supported with a minimal use of a spring material, such as Inconel-718, which generally has a relatively high neutron absorption.

As shown in FIG. 1, the grid plate 80 is orientated so that its protrusions project toward the adjacent parallel plate 60. The portions of the face 83 containing the protrusions 88 may be deflected by known external means in order to permit insertion of the fuel rods without damage to the cladding. The use of the plate 80 permits the construction of a grid structure containing an odd-numbered matrix of cells which offers advantages in terms of control and rearrangement of partly depleted fuel assemblies. Plate 80, however, could be omitted in order to construct a grid containing an even numbered matrix of cells embodying the principles of the invention.

The use of the structure of the invention need not be limited to nuclear reactor applications but is readily adaptable to supporting and spacing tubes in tubular heat exchangers, vapor generators, and the like. In these applications, the plate and pull strap materials could generally be selected without regard to their neutron absorption characteristics.

I claim:

1. In a fuel assembly for a nuclear reactor having a plurality of fuel rods, a spacer for laterally supporting and spacing the rods comprising:

a plurality of longitudinally spaced pairs of grid plates of a first type having oppositely disposed longitudinal faces with protrusions contoured to engage the surfaces of adjacent fuel rods laterally projecting a portion of each face;

a plurality of straps having oppositely disposed longitudinal faces with protrusions laterally projecting a portion of each face;

other types of grid plates;

the pairs of the first type plates being arrayed in parallel with each other pair and generally perpendicular to and intersecting the other types of grid plates, thereby forming a plurality of cells of substantially open cross section through which the fuel rods longitudinally extend;

said protrusions of the first type of grid plate and said strap protrusions projecting into each adjacent cell; and said straps each traversing the longitudinal space between each pair of the first type of grid plate to enable said straps to be pulled so that said strap protrusions engage the fuel rods in the adjacent cells and thereby cause the rods to be transversely spaced and supported by said strap protrusions and said protrusions of the first type of grid plates.

2. A spacer according to claim 1 wherein at least some of said other types of grid plates further comprise a plurality of longitudinally spaced pairs of grid plates of a second type, said straps each individually located in the respective longitudinal space between each longitudinally spaced pair of said grid plates of said second type and in sliding relationship therewith.

3. A spacer according to claim 2 wherein at least some of said other types of grid plates further comprise a plurality of grid plates of a third type, said longitudinally spaced pairs of grid plates of said second type and said grid plates of said third type being arrayed in alternate succession as the rows of said grid structure to form an even numbered matrix of cells.

4. A spacer according to claim 2 wherein at least some of said other types of grid plates further comprise a plurality of grid plates of a third type, a grid plate of a fourth type, said longitudinally spaced pairs of grid plates of said second type and said grid plates of said third type being arrayed in alternate succession as the rows of said grid structure, one plate of said fourth type being disposed in one row between a row having a longitudinally spaced pair of grid plates of said second type and a row having a grid plate of said third type so as to form an odd numbered matrix of cells.

5. A spacer according to claim 3 wherein the material forming said grid plates has a lower neutron capture cross section than the material forming said straps.

6. A spacer according to claim 4 wherein the material forming said grid plates has a lower neutron capture cross section than the material forming said straps.

7. A method of spacing and laterally supporting the fuel elements within a nuclear fuel element assembly cellular spacer grid of the type having a plurality of intersecting grid members at least some of which are longitudinally spaced with respect to the fuel elements longitudinal axes, and having slidable straps with protrusions projecting each of the faces of the straps into adjacent cells which comprises: orientating a strap in sliding contact with and between longitudinally spaced grid members in alternate rows of the grid with the strap protrusions offset in each adjacent cell, inserting a fuel element into each cell, and transversely sliding the strap so that the strap protrusion in each of the cells engages, locates and laterally supports the fuel element therein.

8. A method of spacing and laterally supporting the fuel elements within a nuclear fuel assembly cellular spacer grid of the type having a plurality of intersecting grid members at least some of which are longitudinally spaced with respect to the fuel element axes, and having slidable straps with protrusions projecting each of the faces of the straps into adjacent cells which comprises: orientating a strap in sliding contact with and between longitudinally spaced grid members with the strap protrusions offset in each adjacent cell, inserting a fuel element into each cell, and transversely sliding the strap so that the strap protrusion in each of the cells engages, locates and laterally supports the fuel element therein.

9. A spacer according to claim 5 wherein the grid material is zircaloy.

10. A spacer according to claim 9 wherein the strap material is Inconel Alloy 718.

11. A spacer according to claim 6 wherein the grid material is zircaloy.

12. A spacer according to claim 11 wherein the strap material is Inconel Alloy 718.

13. In a fuel assembly for a nuclear reactor having a plurality of fuel rods, a spacer for laterally supporting and spacing the rods comprising:
 a plurality of longitudinally spaced pairs of grid plates of a first type having oppositely disposed longitudinal faces with protrusions laterally projecting a portion of at least one face;
 a plurality of straps having oppositely disposed faces with protrusions laterally projecting a portion of at least one face;
 other types of grid plates;
 the pairs of the first type plates being arrayed in parallel with each other pair and generally perpendicular to and intersecting the other types of grid plates, thereby forming a plurality of cells of substantially open cross section through which the fuel rods longitudinally extend;
 the protrusions of the first type of grid plate and the strap protrusions projecting adjacent cell; and
 the straps each traversing the longitudinal space between each pair of the first type of grid plate to enable the straps to be pulled so that the strap protrusions engage the fuel rods in adjacent cells and thereby cause the rods to be transversely spaced and supported by the strap protrusions and the protrusions of the first type of grid plates.

14. In a tubular heat exchanger having a plurality of tubes, a spacer for laterally supporting and spacing the tubes comprising:
 a plurality of longitudinally spaced pairs of grid plates of a first type having oppositely disposed longitudinal faces with protrusions laterally projecting a portion of at least one face;
 a plurality of straps having oppositely disposed faces with protrusions laterally projecting a portion of at least one face;
 other types of grid plates;
 the pairs of the first type plates being arrayed in parallel with each other pair and generally perpendicular to and intersecting the other types of grid plates, thereby forming a plurality of cells of substantially open cross section through which the tubes longitudinally extend;
 the protrusions of said first type of grid plate and the strap protrusions projecting into an adjacent cell; and
 the straps each traversing the longitudinal space between each pair of the first type of grid plate to enable the straps to be pulled so that the strap protrusions engage the tubes in adjacent cells causing the tubes to be transversely spaced and supported by the strap protrusions and the protrusions of the first type of grid plates.

* * * * *